Figure 1:
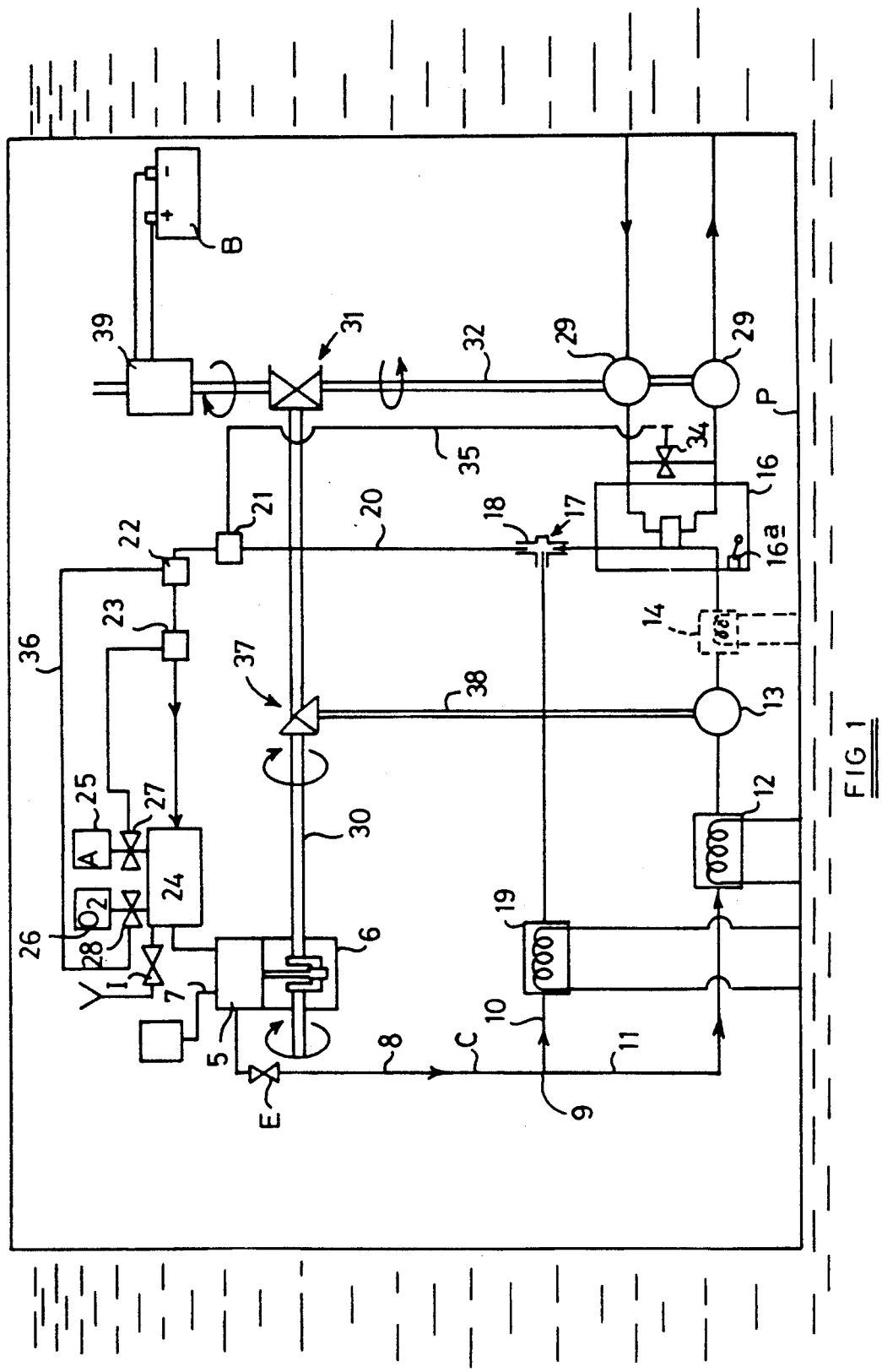

United States Patent [19]

Jubb

[11] Patent Number: 5,016,599
[45] Date of Patent: May 21, 1991

[54] CLOSED CYCLE INTERNAL COMBUSTION ENGINE

[75] Inventor: Albert Jubb, Kenilworth, United Kingdom

[73] Assignee: Cosworth Deep Sea Systems Limited, United Kingdom

[21] Appl. No.: 474,012

[22] PCT Filed: Aug. 24, 1989

[86] PCT No.: PCT/GB89/00984
§ 371 Date: May 30, 1990
§ 102(e) Date: May 30, 1990

[87] PCT Pub. No.: WO90/02254
PCT Pub. Date: Mar. 8, 1990

[30] Foreign Application Priority Data

Aug. 27, 1988 [GB] United Kingdom ............... 8820412

[51] Int. Cl.$^5$ ............................................. F02M 25/07
[52] U.S. Cl. ............................ 123/570; 123/569; 60/278
[58] Field of Search .............. 123/568, 569, 570, 3; 60/274, 278, 279, 280, 605.2, 612

[56] References Cited

U.S. PATENT DOCUMENTS

| 4,231,225 | 11/1980 | Aya | 60/605.2 X |
| 4,587,807 | 5/1986 | Suzuki | 60/278 X |
| 4,674,463 | 6/1987 | Duckworth et al. | 60/278 X |
| 4,756,285 | 7/1988 | Pischinger | 60/280 X |

FOREIGN PATENT DOCUMENTS 2365573 7/1975 Fed. Rep. of Germany.
2274786 1/1976 France.

*Primary Examiner*—Willis R. Wolfe
*Attorney, Agent, or Firm*—Parmelee, Miller, Welsh & Kratz

[57] ABSTRACT

A closed cycle apparatus comprising a combustion chamber, delivery means to deliver inert carrier gas, combustion supporting gas and fuel into the combustion chamber, means to cause the fuel to burn in the combustion chamber, means to exhaust exhaust gas from the combustion chamber, a circuit through which exhaust gas is ducted from the combustion chamber and returned to the combustion chamber to provide the carrier gas, the circuit including means by which the exhaust gas is treated to remove carbon dioxide from the exhaust gas wherein a part only of the exhaust gas in said circuit is treated to remove carbon dioxide.

12 Claims, 2 Drawing Sheets

CLOSED CYCLE INTERNAL COMBUSTION ENGINE

DESCRIPTION OF INVENTION

This invention relates to a combustion process apparatus provided with facilities for operation in a recycle mode, hereinafter referred to as a "closed cycle apparatus", comprising a combustion chamber, delivery means to deliver inert carrier gas, combustion supporting gas and fuel into the combustion chamber, means to cause the fuel to burn in the combustion chamber, means to exhaust exhaust gas from the combustion chamber and a circuit through which exhaust gas is ducted from the combustion chamber or to the combustion chamber to provide the carrier gas, the circuit including means by which at least some of the exhaust gas is treated to remove carbon dioxide from the exhaust gas.

Such engines are capable of operating efficiently where free atmospheric air is not available, for example, under water or where communication/convection with the atmosphere is undesirable, such as in certain types of mine.

An object of the invention is to provide a new and improved closed cycle internal combustion engine of the kind specified above.

According to one aspect of the present invention, we provide a closed cycle apparatus comprising a combustion chamber, delivery means to deliver inert carrier gas, combustion supporting gas and fuel into the combustion chamber, means to cause the fuel to burn in the combustion chamber, means to exhaust exhaust gas from the combustion chamber, a circuit through which exhaust gas is ducted from the combustion chamber and returned to the combustion chamber to provide the carrier gas, the circuit including means by which the exhaust gas is treated to remove carbon dioxide from the exhaust gas wherein a part only of the exhaust gas in said circuit is treated to remove carbon dioxide.

Means may be provided to cool the remainder of the exhaust gas in said circuit, which is fed to the combustion chamber without treatment to remove carbon dioxide, prior to entry to the combustion chamber.

Means may be provided to compress said part of the exhaust gas prior to said treatment to remove carbon dioxide.

Means may be provided to cool said part of the exhaust gas prior to compression.

Means may be provided to cool said part of the exhaust gas after compression.

Means may be provided to recover pressure energy from said part of the exhaust gas after treatment to remove carbon dioxide.

Said means may comprise an injector whereby said part of the gas is injected into a conduit through which said remainder of the gas flows to the combustion chamber of the engine.

The result is an increase in the inlet pressure compared with the engine exhaust pressure so that greater energy is available at the output of the engine by virtue of reduced back pressure.

According to another aspect of the present invention we provide a closed cycle apparatus comprising an internal combustion engine comprising a combustion chamber, delivery means to deliver inert carrier gas, combustion supporting gas and fuel into the combustion chamber, means to cause the fuel to burn in the combustion chamber, means to exhaust exhaust gas from the combustion chamber, a circuit through which exhaust gas is ducted from the combustion chamber and returned to the combustion chamber to provide the carrier gas, the circuit including means by which the exhaust gas is treated to remove carbon dioxide from the exhaust gas wherein the exhaust gas is fed by the circuit into driving relationship with turbo charger turbine means and then into compressing relationship with turbo charger impeller means, whereby the exhaust is compressed prior to treatment to remove carbon dioxide.

Means may be provided to cool the exhaust gas after leaving said driving relationship with the turbine means before entering said compressing relationship with the impeller means.

Means may be provided to feed the whole of the exhaust gas into said driving relationship with said turbine means.

Means may be provided to separate the compressed exhaust gas downstream of the impeller means into a first part which is treated to remove carbon dioxide and a second part which is not treated to remove carbon dioxide.

Means may be provided whereby said first part of the exhaust gas is further compressed prior to said treatment to remove carbon dioxide.

Means may be provided to cool said first part of the exhaust gas prior to said further compression.

Means may be provided to cool said first part of the exhaust gas after said further compression.

Means may be provided whereby the second part of the exhaust gas, which is fed to the compression chamber without treatment to remove carbon dioxide, may be cooled prior to entry into the compression chamber.

Means may be provided to recover pressure energy from the first part of the exhaust gas after treatment to remove carbon dioxide.

Said means may comprise an injector wherein said first part of the exhaust gas is injected into a conduit through which said second part of the exhaust gas flows to the combustion chamber of the engine.

The result is an increase in the inlet pressure compared with the engine exhaust pressure so that greater energy is available at the output of the engine by virtue of reduced back pressure.

In both aspects of the invention the exhaust gas may be treated with water to remove carbon dioxide and the means by which the exhaust gas is thus treated may comprise an absorber in which the exhaust gas is treated to absorb carbon dioxide in the water.

In both aspects of the invention supply means are preferably provided to supply a further component into said combustion chamber in an amount which is controlled such that the gamma value of the mixture equals the predetermined value.

The gamma value may lie in the range 1.3–1.5.

The further component may comprise a monotomic inert gas comprising one, or a mixture of at least two, of xenon, crypton, neon, helium, argon.

A combustion supporting gas content control means may be provided to maintain a predetermined combustion supporting gas content in the exhaust gas.

A combustion supporting gas content control means may be provided to maintain a predetermined combusion supporting gas content in the gas to be introduced into the combustion chamber.

The delivery means may include a manifold where combustion supporting gas is mixed with treated exhaust gas prior to passage into the combustion chamber.

The supply means may supply the further component to said manifold to be mixed with the combustion supporting gas and the recycled exhaust gas prior to passage into the combustion chamber.

The engine may comprise a sensor means responsive to a property of exhaust gas returned to the combustion chamber and means adapted to vary the rate in which the further component is delivered by the supply means under the control of the sensor means to control the proportions of the inert carrier gas and further component such that the gamma value of the gas delivered to the combustion chamber lies in said predetermined range.

The sensor means may be adapted to control the rate at which the further component is added to the exhaust gas to provide, when combustion supporting gas has been added thereto, a gas having a gamma value approximately that of air.

The apparatus may be a diesel engine or a gas turbine engine.

The apparatus may be fuelled with a hydrocarbon fuel.

Figure 2:
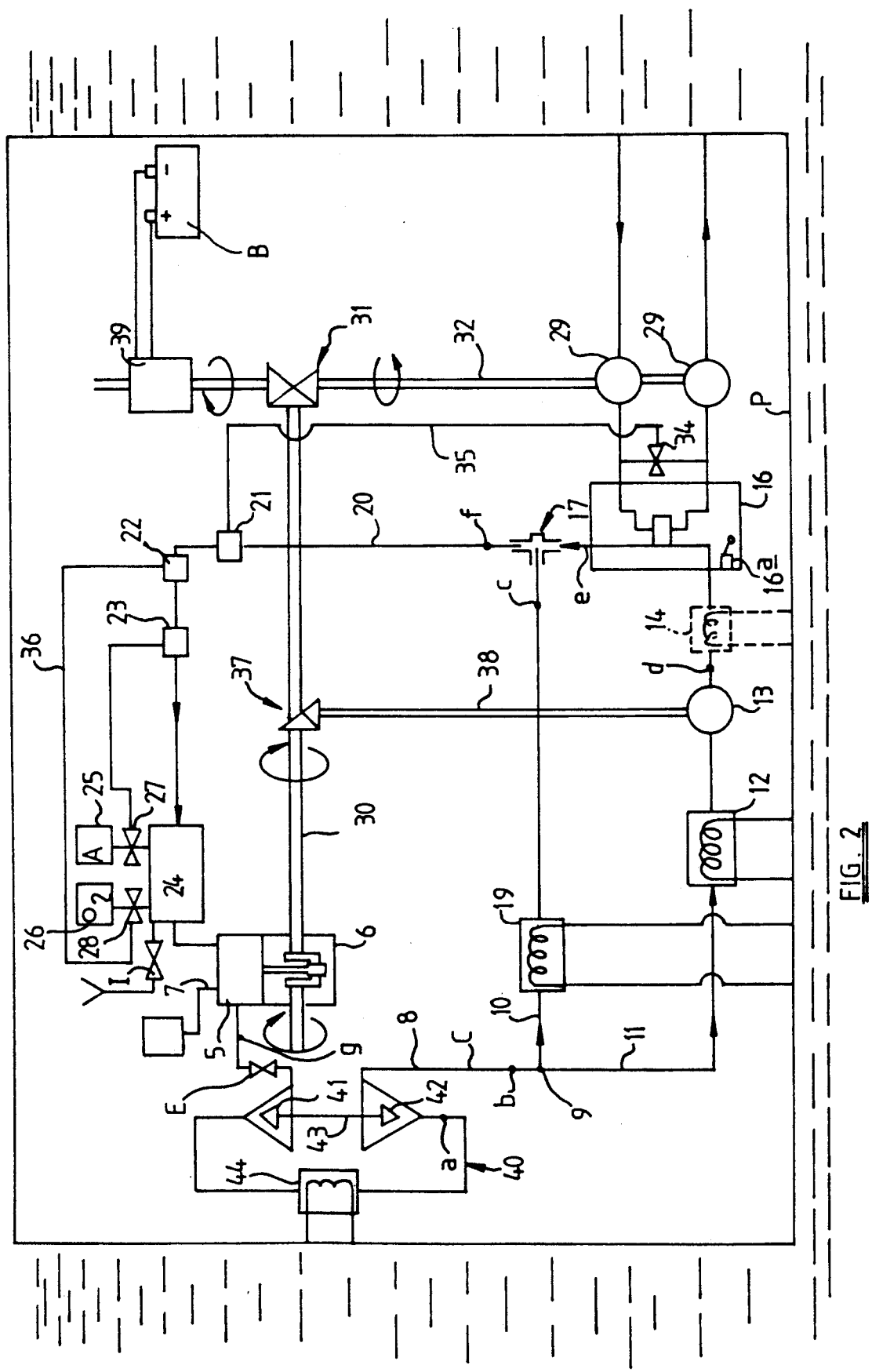

The invention will now be described by way of example with reference to the accompanying drawings in which FIG. 1 is a diagrammatic illustration of a first embodiment of the invention, as applied to a diesel engine, and FIG. 2 is a schematic illustration similar to that of FIG. 1 but showing a second embodiment of the invention.

The internal combustion engine which is referred to in the first embodiment of this invention is devised for operating both under conditions of normal aspiration from the atmosphere and environments where communication with free atmosphere is undesirable, or under water, in which latter context the engine will hereinafter be described. The engine comprises a four cylinder reciprocating unit 6 designed to operate on a diesel cycle and hence having a piston reciprocable in a cylinder which provides a combustion chamber 5 and an inlet valve or valves through which a mixture of gases containing oxygen or other combustion supporting gas are admitted to the combustion chamber and an exhaust valve or valves through which exhaust gas is ducted from the combustion chamber. The engine also comprises a means 7 to inject fuel into the combustion chamber and a circuit C through which the exhaust gas is ducted from and returned to the combustion chamber.

The circuit C comprises a first part 8 which extends to a junction 9 from which a bypass part 10 extends. Downstream of the junction 9 there is a main part 11 of the circuit C which extends via a water cooler 12, compressor 13 and a further optional water cooling unit 14 to an absorber unit 16.

Downstream of the absorber unit 16 the main part 11 of the circuit continues to an injector 17 by which gas leaving the absorber unit 16 is injected into the bypass branch 10. The bypass branch 10 includes a water cooler 19 upstream of the injector 17.

Downstream of the injector 17 the circuit comprises a third part 20 which feeds gas back to the combustion chamber 5 via sensor units 21, 22, 23 and a manifold 24. A reservoir 25 of argon and a reservoir 26 of oxygen are provided and are arranged to feed argon and oxygen respectively to the manifold 24 through control valves 27, 28 respectively.

The absorber 16 is provided with means to expose water within the absorber 16 to the exhaust gas circulated therethrough by main branch 11 of the circuit C so that carbon dioxide in the exhaust gas is absorbed in the water. Water is circulated through the absorber 16 by pumps 29 driven from an engine drive shaft 30 via a gearbox 31 and shaft 32. In order to control the amount of water circulated through the absorber 16 by the pump 29, a motorised bypass valve 34 is provided which is adjusted in accordance with a signal provided along a line 35 from the sensor 21 which senses the pressure in the circuit C downstream of the absorber 16.

In the operation of the engine in a non-atmospheric closed cycle, oxygen from the reservoir 26 is delivered to the manifold 24 at the operating pressure of the engine which may be, for example, about one atmosphere and is ducted into the engine cylinder together with the carrier gas. The gas charge is compressed within the engine cylinder, causing the temperature of the gas to increase, and fuel is injected, producing combustion of the fuel. Exhaust gas is conducted from the combustion chamber 5 through the first part 8 of the circuit C and a first part of the exhaust gas passes via the main part 11 of the circuit C whilst a second part passes along the bypass part 10 of the circuit C. The proportions of the exhaust gas passing through the bypass branch and the main branch may vary. In the present example one third of the exhaust gas passes through the bypass branch 10, but if desired up to, for example, two thirds of the exhaust gas may pass via the bypass branch 10.

The gas in the bypass branch 10 and the main branch 11 is cooled by conventional water coolers 12, 19 to which sea water is fed at ambient pressure existing externally to a pressure wall P within which the engine is installed. Suitable means, not shown, is provided to circulate the water through the coolers 12, 19. The coolers ensure that the exhaust gas is cooled to a temperature approaching that of the temperature of the water externally to the pressure wall P, for example, 10°–20° C. above the water temperature.

The exhaust gas in the main branch 11, after cooling by the cooler 12, is compressed by the compressor 13 which may be of any suitable type and may be compressed to a pressure of, for example, five atmospheres. If desired, after compression the exhaust gas may be cooled by a further water cooler 14 and is then fed into the absorber 16 in which the exhaust gas is treated with sea water at the compressed pressure, for example, a pressure of about five atmospheres, to remove carbon dioxide. The absorber may be of any suitable type, preferably comprising a rotor provided with wire mesh or other material, having a high surface area to volume ratio, through which the water is thrown radially outwardly by centrifugal force, whilst the exhaust gas is caused to pass therethrough in counterflow. This absorber achieves rapid absorption of carbon dioxide into the sea water and is compact. The absorber unit 16 is provided with a level control 16a to ensure that the absorber is not flooded or run below a predetermined water level.

The thus treated exhaust gas then passes to the injector 17 where it is injected into the bypass branch 10, in which the exhaust gas has not been compressed or treated with carbon dioxide, but has only been cooled by the cooler 19 and so is at the operating pressure of the engine. The expansion of the gas in the main branch 11 may be utilised to recover some of the input power to the compressor, by an injector or by a converted expansion engine. The recombined portions of exhaust gas then pass via the part 20 of the conduit to the sensor unit 21. The sensor 21 measures the total pressure in the gas circuit C, i.e. the operating pressure and provides a signal along the line 35 to the valve 34 so as to increase the water flow through the absorber 16 if the pressure exceeds the predetermined pressure and to reduce the water flow if the pressure falls below a predetermined pressure, so as to control the amount of carbon dioxide removed from the exhaust gas. The exhaust gas then passes to a sensor unit 22 which provides a control signal via the line 36 to the valve 28 which controls the amount of oxygen fed to the manifold 24 from the reservoir 26 to meter the correct amount of oxygen into the carrier gas. The sensor unit 22 comprises a conventional sensor for detecting oxygen content and may be provided with means to adjust the oxygen supply in accordance with operating parameters of the engine. Alternatively, the sensor 22 may be positioned to sense the oxygen content of the gases leaving the manifold 24 and to control the valve 28 to provide a desired oxygen content in the inducted gas.

The exhaust gas then passes to a futher sensor unit 23 which is arranged to provide a control signal to the metering valve 27 which meters the amount of argon fed to the manifold 24 from the reservoir 25 to ensure that the proportion of argon in the inducted gas provides a desired ratio of specific heats, gamma. In the present example the sensor 23 comprises a compressor having a pressure ratio at the rate of around 2:1 in which the exhaust gas is compressed followed by means to pass the compressed exhaust gas to a convergent/divergent passage, together with means to measure the inlet pressure and throat pressure in the passage. Changes of gamma changes the ratio of these two pressures (absolutely) and comparison means are provided to compare the two pressures and to produce an output in relation thereto which controls the valve 27. The change of ratio which occurs is very small and thus highly accurate transducers and comparative electrical circuits are provided.

Thereafter the exhaust gas is fed to the manifold 24 where argon and oxygen are added to the exhaust gas from the reservoirs 25, 26 via the valves 27, 28 in accordance with the sensor units as described hereinbefore.

During an initial stage of the operation of the engine on closed cycle the proportions of carbon dioxide and argon in the circulating gas will increase and the proportion of nitrogen will decrease until an equilibrium condition is established (depending upon the characteristics of the absorption process) in which the rate of which carbon dioxide is removed by absorption of water is equal to the rate of which carbon dioxide is added during the combustion process.

The supply of air for the initial charge from both cycle operations may be achieved by supplementary supply bottles, or air may be ducted from available free space in the engine compartments. Of course, once closed cycle operation has started, further air is not required but only a continual supply of oxygen. If the engine is shut down from a closed cycle system in balanced operation, the initial charge is suitable for another start-up without additions.

Alternatively and preferably, operation of the engine is initiated in the atmosphere on "open cycle", in which the exhaust gases are discharged to atmosphere by a two-way valve E and air is drawn into the manifold from atmosphere via a two-way valve 1 and then switched over to closed cycle, in which an increasing proportion of exhaust gas is ducted to the absorber by progressively closing valve E to atmosphere, causing, in consequence, an increasing proportion of treated exhaust gases to be returned to the manifold 24 with the corresponding closing of valve 1 to atmosphere. When changeover to closed cycle has been completed the engine may be submerged to its intended location. The rate of switchover is limited by the rate at which argon can be fed in to maintain the desired 5:3 volume ratio of argon to carbon dioxide, otherwise the ignition can be affected in the diesel engine and it could stop. Therefore, the changeover rating is affected by power demanded in the operation until the argon level can reach that desired. When it is desired to terminate closed cycle operation, the exhaust valve E is open to atmosphere and then inlet valve 1, if desired both valves may be open at the same time.

The engine as above described is designed to operate in air, or a charge which simulates air, that is, with a mixture of charged gases having a gamma ratio of approximately 1.4 and the induction pressure may be a little above atmospheric pressure by virtue of the increase in pressure caused by injection of the part of the exhaust gas which leaves the absorber. The water vapour generated combustion is, of course, condensed in the coolers and/or absorber and so is removed from the exhaust gas.

Referring now to FIG. 2 wherein is shown a modification of the closed cycle internal combustion engine shown in and described with reference to FIG. 1, in that a turbo charger 40 is incorporated in the circuit C. Thus the exhaust gas exhausted from the combustion chamber 5 passes initially to act on a turbine 41 of the turbo charger in driving relationship therewith, so that the turbine 41 drives an impeller 42 through a shaft 43 in conventional manner. After leaving driving relationship with the turbine 41, the gas passes via a cooling unit 44 to enter into compressing relationship with the impeller 42. Thereafter the thus compressed exhaust gas continues around the circuit C in an exactly similar manner to that described in connection with FIG. 1. By passing the exhaust through the cooler 44, which is supplied with water at sea depth pressure in the same way as the coolers 12, 19 and the optional cooler 14, water vapour in the exhaust is condensed and means are provided to pump the condensate water out of the pressure wall P, the cooler 44 in the present example reduces the exhaust gas temperature to a temperature lying in the range 10° C. to 20° C. above C. temperature.

By providing the turbo charger the engine runs with a higher intake pressure than the exhaust pressure, thereby increasing the efficiency of the engine.

In this example the pressure and temperatures at the locations shown are as follows, but other pressures and/or temperatures may be used if desired.

| | | |
|---|---|---|
| a = | (Turbo blower, Turbine out - Blower IN) | Press = 1 atm Temp = 20° C. |
| b = | (Turbo blower out) | Press = 2.7 atm T = 150° C. |
| c = | Cooled blower out | Press = 2.6 atm T = 20° C. |
| d = | Absorber Compressor out | Press = 5.2 atm T = 130° C. |
| e = | Absorber out | Press = 5.1 atm T = 20° C. |
| f = | Outlet of injector - Engine inlet | Press = 2.8 atm T = 20° C. |

-continued

| g = Diesel exhaust gas | Press = 2.2 atm T = 400° C. |

In both embodiments the compressor 13 is drivingly connected to the drive shaft 30 by a gearbox 37 and drive shaft 38. The drive shaft 29 also drives a generator 39 through the gearbox 31, conveniently through a releasable coupling (not shown). The part may be derived from the engine, either directed by a power take off (not shown) or in the form of electricity from the generator. Conveniently the generator 39 is connected to a battery B and may be operated as a starter motor.

In all the embodiments described above, the ratio of argon to carbon dioxide is calculated to have the same ratio of specific heats as air in the relevant temperature range of compression in the engine cylinder, i.e. between 100° C. and 500° C. For example, in practical terms 3 moles of carbon dioxide to 5 moles of argon or helium make 8 moles of a mixture which, when oxygen is added, behaves in all practical respects like air.

The ratio of the partial pressures of carbon dioxide to argon is the molar ratio, i.e. 3:5. The ratio of carbon dioxide removal to argon removal is equal to the solubility ratio$\times 3/5$, i.e.

$$\frac{76.6}{2.4} \times \frac{3}{5} = 19.1.$$

Thus the ratio of argon to carbon dioxide in the treated gas is 5:3, equal to the rate at which argon and carbon dioxide is delivered to the combustion chamber. In other words, the carbon dioxide added to the carrier gas by the combustion process has been removed.

Whilst the desired ratio of argon to $CO_2$ is 5:3 for best operation, other ratios are acceptable depending on the engine design and fuel quality for lower ratios, and depends on the ruggidness of construction and pressure operation levels of the engine for higher ratios.

In general the operation of the power unit is self-regulating, dependent upon the operation of the absorber unit, in as much as, if the proportion of carbon dioxide in the carrier gas increases the partial pressure of the carbon dioxide in the exhaust gas increases commensurately, increasing the rate at which carbon dioxide is removed by the absorbing process.

However some argon will be removed by the absorber, and desirably means are provided to apply argon at a small rate, conveniently entering the manifold 20, to replace this lost argon. Advantageously the rate of such addition of argon to the manifold is controlled by the sensor unit 22 to a desired rate.

Although argon has been described above as the inert gas, the inert gas may comprise one, or a mixture of at least two of, xenon, crypton, neon, helium, argon.

Whilst the invention has been described above in relation to diesel engines it is to be appreciated that the invention is not limited in this respect, and may be used to advantage in other types of engine such as gas turbines or sterling engines. Furthermore, the exhaust gas may be treated at any desired pressure which in practical terms can lie between atmospheric pressure and thirty atmospheres.

If desired the composition of the inducted gas may be such as to achieve any desired ratio gamma including ratios gamma outside the range 1.3 to 1.5.

The above described embodiments may be modified by omitting the above described means for removing carbon dioxide with water. If desired, carbon dioxide may be removed by other means, for example by treatment with potassium hydroxide.

If desired, gas other than oxygen may comprise the combustion supporting gas, for example hydrogen peroxide, or a mixture of suitable combustion supporting gas may be provided with suitable supply and control mans analogous to those described above for oxygen.

In this description and claims the proportion of carbon dioxide in the carrier gas is expressed in % by volume of the total volume of carrier gas.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof.

What is claimed is:

1. A closed cycle apparatus comprising an internal combustion engine having a combustion chamber, delivery means to deliver inert carrier gas, combustion supporting gas and fuel into the combustion chamber, means to cause the fuel to burn in the combustion chamber, a circuit through which exhaust gas is ducted from the combustion chamber and returned to the combustion chamber to provide the carrier gas, the circuit including means by which the exhaust gas is treated to remove carbon dioxide from the exhaust gas wherein the whole of the exhaust gas is fed by the circuit into driving relationship with turbo charger turbine means and then into compressing relationship with turbo charger impeller means, whereby the whole of the exhaust gas is pre-compressed and means are provided to separate the pre-compressed exhaust gas downstream of the impeller means into a first part which is passed through a first conduit to be further compressed and then treated to remove carbon dioxide and a second part which is passed through a second conduit to be returned to the combustion chamber without being further compressed and treated to remove carbon dioxide.

2. An apparatus according to claim 1, wherein means are provided, selected from the group comprising, means to cool the exhaust gas after leaving said driving relationship with the turbine means before entering said compressing relationship with the impeller means; means to cool said first part of the exhaust gas prior to further compression; means to cool said first part of the exhaust gas after said further compression; means whereby the second part of the exhaust gas, which is fed to the compression chamber without treatment to remove carbon dioxide, is cooled prior to entry into the compression chamber.

3. An apparatus according to claim 1, wherein means are provided to recover pressure energy from the first part of the exhaust gas after treatment to remove carbon dioxide.

4. An apparatus according to claim 3 wherein said means comprises an injector, disposed in said second conduit and connected to the first conduit wherein said first part of the exhaust gas is injected into the second conduit to recover said pressure energy from the first part of the exhaust gas after treatment to remove carbon dioxide.

5. An apparatus according to claim 1, wherein the means by which the exhaust gas is treated to remove carbon dioxide comprises an absorber in which the exhaust gas is treated to absorb carbon dioxide in the water.

6. An apparatus according to claim 1, wherein a combustion supporting gas content means is provided to maintain a predetermined combustion supporting gas content in the exhaust gas, or in the gas to be introduced into the combustion chamber.

7. An apparatus according to claim 1, wherein the delivery means includes a manifold where combustion supporting gas is mixed with treated exhaust gas prior to passage into the combustion chamber.

8. An apparatus according to claim 7, wherein supply means are provided to supply a further component into said combustion chamber in an amount which is controlled such that the gamma value of the mixture equals a predetermined value and the supply means supplies the further component to said manifold to be mixed with the combustion supporting gas and the recycled exhaust gas prior to passage into the combustion chamber.

9. An apparatus according to claim 1, wherein supply means are provided to supply a further component into said combustion chamber in an amount which is controlled such that the gamma value of the mixture equals a predetermined value.

10. An apparatus according to claim 9, wherein a further component comprises a monotonic inert gas comprising one, or a mixture of at least two, of xenon, krypton, neon, helium, argon.

11. An apparatus according to claim 9, wherein the engine comprises a sensor means responsive to a property of exhaust gas returned to the combustion chamber and means adapted to vary the rate in which the further component is delivered by the supply means under the control of the sensor means to control the proportions of the inert carrier gas and further component such that the gamma value of the gas delivered to the combustion chamber lies in said predetermined range.

12. An apparatus according to claim 1 wherein means are provided to treat the exhaust gas with water to remove carbon dioxide.

* * * * *